(12) United States Patent
Verbeke et al.

(10) Patent No.: US 10,421,833 B2
(45) Date of Patent: Sep. 24, 2019

(54) METHOD FOR IMPROVING TOUGHNESS OF POLYISOCYANATE POLYADDITION REACTION PRODUCTS

(71) Applicant: Huntsman International LLC, The Woodlands, TX (US)

(72) Inventors: Hugo Verbeke, Wilsele (BE); Hans Godelieve Guido Verbeke, Lubbeek (BE); Christian Esbelin, Schaerbeek (BE); Ainara Astaburuaga Gutierrez, Etterbeek (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 14/890,632

(22) PCT Filed: Apr. 9, 2014

(86) PCT No.: PCT/EP2014/057102
§ 371 (c)(1),
(2) Date: Nov. 12, 2015

(87) PCT Pub. No.: WO2014/191131
PCT Pub. Date: Dec. 4, 2014

(65) Prior Publication Data
US 2016/0075816 A1 Mar. 17, 2016

(30) Foreign Application Priority Data

May 31, 2013 (EP) ..................................... 13170081

(51) Int. Cl.
*C08G 18/34* (2006.01)
*C08G 18/48* (2006.01)
*C08G 18/42* (2006.01)
*C08G 18/22* (2006.01)
*C08G 18/32* (2006.01)
*C08G 18/72* (2006.01)

(52) U.S. Cl.
CPC ......... *C08G 18/348* (2013.01); *C08G 18/222* (2013.01); *C08G 18/3203* (2013.01); *C08G 18/4233* (2013.01); *C08G 18/4288* (2013.01); *C08G 18/4875* (2013.01); *C08G 18/4891* (2013.01); *C08G 18/72* (2013.01)

(58) Field of Classification Search
CPC .... C08G 18/348; C08G 18/72; C08G 18/222; C08G 18/3203; C08G 18/4875; C08G 18/4891; C08G 18/4233; C08G 18/4288
See application file for complete search history.

(56) References Cited

U.S. PATENT DOCUMENTS

| | | | | |
|---|---|---|---|---|
| 6,265,464 B1* | 7/2001 | McLaren | ............... | B29C 35/08 522/111 |
| 6,806,342 B2* | 10/2004 | Bleys | ................. | C08G 18/7664 521/176 |
| 2008/0262168 A1* | 10/2008 | Bleys | .................. | C08G 18/092 525/452 |
| 2010/0036030 A1* | 2/2010 | Schijndel | ............... | A63B 53/00 524/315 |
| 2012/0046436 A1* | 2/2012 | Debien | ................ | C08G 18/003 528/68 |

FOREIGN PATENT DOCUMENTS

| | | |
|---|---|---|
| GB | 1 128 943 | 10/1968 |
| WO | 95/01407 | 1/1995 |
| WO | 2007/049028 | 5/2007 |
| WO | 2013/017843 | 2/2013 |

OTHER PUBLICATIONS

Bareis, David, et al.; "Advances in Urethane Composites: Resins With Tunable Reaction Times"; Composites 2011; American Composites Manufacturers Association; Feb. 2-4, 2011; p. 1-7.
Heberer, Dan, et al.; "Novel Isocyanate-Based Resin Systems With Tunable Reaction Times"; 2010; p. 1-8.
Starner Ph.D., William; "Alternatives in Toughening"; Presented at a meeting of the Thermoset Resin Formulators Association; Chicago, Illinois; Sep. 15-16, 2008; p. 1-15.

* cited by examiner

*Primary Examiner* — Rabon A Sergent
(74) *Attorney, Agent, or Firm* — Huntsman International LLC; Robert Diaz

(57) ABSTRACT

Use of compounds selected from polyols derived from dimer fatty acids and/or dimer fatty alcohols as toughening agent in a process for making polyisocyanate polyaddition reaction products, in particular for polyisocyanate polyaddition reaction products having a hardblock >40% and a process for making said products.

13 Claims, No Drawings

METHOD FOR IMPROVING TOUGHNESS OF POLYISOCYANATE POLYADDITION REACTION PRODUCTS

This application is the National Phase of International Application PCT/EP2014/057102 filed Apr. 9, 2014 which designated the U.S. and which claims priority to Foreign Application No. 13170081.7 filed May 31, 2013. The noted applications are incorporated herein by reference.

FIELD OF INVENTION

The present invention relates to methods for improving the toughness of polyisocyanate polyaddition reaction products.

The present invention further relates to the use of addition products made of polyols derived from dimer fatty acids and/or dimer fatty alcohols as toughening agent.

The present invention further relates to polyisocyanate polyaddition reaction products having increased toughness.

The present invention further relates to polyisocyanate polyaddition reaction products having a glass transition temperature >80° C.

In particular the invention relates to polyisocyanate polyaddition reaction products having a hardblock content of more than 40%.

The polyisocyanate polyaddition reaction products according to the present invention are very suitable to make polyisocyanurate comprising materials (PIR) having a glass transition temperature >80° C. and toughness value $G_{1c}$>200 J/m$^2$.

BACKGROUND OF THE INVENTION

To increase the toughness of polyisocyanate polyaddition reaction products such as polyurethane, polyurea or polyisocyanurate containing products, plasticizers may be added as additives giving these products improved flexibility and durability. Most commonly phthalate esters are used as plasticizers. Plasticizers work by embedding themselves between the chains of polymers, spacing them apart (increasing the "free volume"), and thus significantly lowering the glass transition temperature of the products while making the products softer.

Controlling the toughness of polyisocyanate polyaddition reaction products may also be done by varying the amount of polyols having a high molecular weight (and therefore the hardblock content of the polyisocyanate polyaddition reaction products). This leads however to materials having lower glass transition temperatures.

Alternatively the toughness of polyisocyanate polyaddition reaction products may also be done by adding core shell particles however this comprises the addition of solid particles to a liquid resin which implies stability issues.

AIM OF THE INVENTION

It is a goal of the invention to improve the toughness of polyisocyanate polyaddition reaction products having a hardblock content >40% and a glass transition temperature (Tg)>80° C.

It is a further object of the present invention to develop structural components which can withstand high external forces and can be used, for example, in automobile construction. The structural components to be developed, also referred to as composite elements, should be able to serve as replacements for known steel structures and, in particular, have advantages in respect of their weight, manufacturing process and maintenance intensity.

SUMMARY OF THE INVENTION

Surprisingly we have found that polyisocyanate polyaddition reaction products having a hardblock content of at least 40% and a glass transition temperature of at least 80° C. may be improved in toughness without reducing significantly the glass transition temperature of the products.

According to the invention, the use of compounds selected from polyols derived from dimer fatty acids and/or dimer fatty alcohols as toughening agent in a process for making polyisocyanate polyaddition reaction products is disclosed.

Preferably, the polyisocyanate polyaddition reaction products have a hardblock content >40%.

According to embodiments, the toughening agent is selected from polyester polyols derived from dimer fatty acids According to embodiments, the dimer fatty acids are selected from dimer fatty acids wherein the fatty acid is selected from C10-C30, more preferably C12-C25, in particular C14-C22 fatty acids.

According to embodiments, the dimer fatty acids include dimerisation products of oleic acid, linoleic acid, linolenic acid, palmitoleic acid and/or elaidic acid.

According to the invention a method for improving the toughness of polyisocyanate polyaddition reaction products having a glass transition temperature of at least 80° C. is disclosed. Said method comprising at least reacting at an isocyanate index of at least 100:
(a) isocyanates, and
(b) isocyanate-reactive compounds, and optional
(c) catalyst compounds, and optional
(d) blowing agents and/or other auxiliary compounds characterized in that the isocyanate-reactive compounds (b) comprise 1-20 pbw of compounds selected from polyols derived from dimer fatty acids and/or dimer fatty alcohols according to the first aspect of the invention (calculated on the total weight of ingredients (a)-(d)) and wherein the hardblock content of the polyisocyanate polyaddition reaction products is at least 40%.

According to embodiments, the isocyanate-reactive compounds (b) comprise preferably 2.5 up to 7 pbw of compounds selected from polyols derived from dimer fatty acids and/or dimer fatty alcohols (calculated on the total weight of ingredients (a)-(d)).

According to embodiments, the isocyanate-reactive compounds (b) comprise polyamines and/or polyetherpolyols and/or polyesterpolyols having an average molecular weight of preferably 32-6000 and an average nominal functionality of preferably 1-8 and the polyisocyanate polyaddition reaction products have polyurethane and/or polyurea bondings.

According to embodiments, the isocyanates (a) are selected from polyisocyanates selected from aliphatic, cycloaliphatic, araliphatic and, preferably, aromatic polyisocyanates, such as toluene diisocyanate in the form of its 2,4 and 2,6-isomers and mixtures thereof, diphenylmethane diisocyanates and variants thereof, and mixtures of diphenylmethane diisocyanates (MDI) and oligomers thereof having an isocyanate functionality greater than 2.

According to embodiments, the auxiliary compounds (d) may be selected from non-isocyanate-reactive solvents, surfactants, scavengers like alkylorthoformate and in particular tri-isopropylorthoformate, antimicrobial agents, fire retardants, smoke suppressants, UV-stabilizers, colorants, plasticizers, internal mould release agents, rheology modifiers, wetting agents, dispersing agents and fillers.

According to embodiments, the method for improving the toughness of polyisocyanate polyaddition reaction products comprises a moulding process selected from a cast moulding process, a compression moulding process, a resin transfer moulding process (with or without use of vacuum), a resin infusion process, a prepregging process or a hand lay-up process conducted according to an injection-, an extrusion- or a pultrusion process.

According to embodiments, the polyisocyanate polyaddition reaction products are selected from polyisocyanurate (PIR) comprising products and the method comprises a process wherein the compounds (a)-(d) are reacted at an isocyanate index in the range 150 up to 15000, preferably at least 300 and most preferably at least 500 and the catalyst comprises at least one trimerization catalyst.

According to embodiments, the polyisocyanate polyaddition reaction products are selected from polyisocyanurate (PIR) comprising products and the trimerization catalyst is selected from organic metal salts, preferably alkali or earth alkali organic metal salts, more preferably metal carboxylates or alkoxides and mixtures thereof, the carboxylate/alkoxide group preferably having 1-12 carbon atoms such as potassium acetate, potassium hexanoate, potassium ethylhexanoate, potassium octanoate, potassium lactate, sodium ethoxide, sodium formate, potassium formate, sodium acetate, potassium benzoate and mixtures thereof.

According to embodiments, the polyisocyanate polyaddition reaction products are selected from polyisocyanurate (PIR) comprising products and the trimerization catalyst is selected from a composition containing a lithium halide (preferably LiCl) and an epoxy resin.

According to embodiments, the polyisocyanate polyaddition reaction products are polyisocyanurate (PIR) comprising products and further comprises after the step of reacting ingredients (a)-(d), the step of applying a curing step at elevated temperature in order to form a cured polyisocyanurate comprising product, preferably the curing is conducted at a temperature between 50° C. and 350° C. and most preferably between 125° C. and 250° C.

According to embodiments, the polyisocyanate polyaddition reaction products are polyurethane (PUR) or polyurea comprising products made at an isocyanate index around 100, preferably at an isocyanate index in the range 90-110 and wherein the amount and/or type of isocyanate reactive compounds are chosen such that the hardblock content is >40 wt %, preferably >50 wt %.

According to embodiments, the polyisocyanate polyaddition are polyurethane (PUR) comprising products and wherein the catalyst compound (c) is a (PUR) catalyst used in an amount of 0.1-2% by weight (on all isocyanate reactive ingredients) and preferably selected from amine catalysts, like triethylenediamine, N,N-dimethylethanolamine, bis (N,N-dimethylaminoethyl)ether, 2-(2-dimethylaminoethoxy)-ethanol, N,N,N'-trimethyl-N'-hydroxyethylbisaminoethyl-ether, N-(3-dimethylaminopropyl)-N,N-diisopropanolamine, N,N'-diethylpiperazine and 1-(bis(3-dimethylaminopropyl)amino-2-propanol and/or organometallic compounds like stannous octoate and dibutyltin dilaurate and mixtures of these catalysts.

According to embodiments, polyisocyanurate (PIR) comprising products made according to the method of the invention are disclosed, said products having a hardblock content of more than 50%, preferably >60%, a glass transition temperature >150° C. and a toughness value $G_{1c}$>200 J/m², preferably $G_{1c}$>300 J/m².

Further polyurethane (PUR) and/or polyurea comprising products made according to the method of the invention are disclosed, said products having a hardblock content of more than 40%, a glass transition temperature >80° C. and a toughness value $G_{1c}$>200 J/m², preferably $G_{1c}$>300 J/m², most preferably $G_{1c}$>400 J/m².

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying examples which illustrate, by way of example, the principles of the invention.

DEFINITIONS AND TERMS

In the context of the present invention the following terms have the following meaning:
1) The composition comprising at least a polyisocyanate composition and a curing agent compound which is reactive toward isocyanates (such as a polyol) or any other suitable curing agent is in the text referred to as the "curable composition". This composition refers to a liquid composition prior to curing.
2) The isocyanate index or NCO index or index is the ratio of NCO-groups over isocyanate-reactive hydrogen atoms present in a formulation, given as a percentage:

$$\frac{[NCO] \times 100 \, (\%)}{[\text{active hydrogen}]}$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are taken into account in the calculation of the isocyanate index.

3) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

5) The word "average" refers to number average unless indicated otherwise.
6) "Liquid" means having a viscosity of less than 10 Pa·s measured according to ASTM D445-11a at 20° C.
7) "Trimerization catalyst" as used herein refers to a catalyst being able to catalyse (promote) the formation of isocyanurate groups from polyisocyanates.
8) "Polyisocyanate polyaddition reaction products" refer to products comprising the reaction product of (a) isocyanates with (b) compounds which are reactive toward isocyanates and in the presence of (c) catalysts and optionally (e) auxiliaries and/or other additives. The compounds which are reactive toward isocyanates can be compounds having isocyanate-reactive hydrogen atoms such as (poly)amines and/or polyols leading towards urea and/or urethane bondings. Alternatively the isocyanates can react with isocyanates leading to polyisocyanuarates.
9) "Polyisocyanurate comprising material" refers to a polyisocyanate composition comprising more than 10% by weight polyisocyanurate, preferably at least 50% by weight, more preferably 75% by weight, calculated on the total weight of the material.
10) The term "hardblock content" refers to 100 times the ratio of the amount (in pbw) of polyisocyanate+isocyanate-reactive materials having a molecular weight of 500 or less (wherein polyols having a molecular weight of more than 500 incorporated in the polyisocyanates are not taken into account) over the amount (in pbw) of all polyisocyanate+all isocyanate-reactive materials used in making the product.
11) "Density" refers to the overall density measured according to ISO 845.
12) The "glass transition temperature" (Tg) refers to the temperature at which a reversible transition from a hard glass condition into a rubber-elastic condition occurs. The glass transition temperature (Tg) was measured according to ASTM D 4065-1, with a forced constant amplitude and a fixed frequency in a dual cantilever. The peak maximum of the Tangent Delta (tan d) profile is taken as the Tg
13) "Toughness" or "fracture toughness" is a measure of the energy a sample can absorb before it break. In the context of the present invention, the toughness is measured according to ISO 13586 and is expressed as $G_{1c}$ value (unit J/m$^2$).

DETAILED DESCRIPTION

According to the present invention the use of additives selected from compounds made of polyols derived from dimer fatty acids and/or dimer fatty alcohols as toughening agent in a process for making polyisocyanate polyaddition reaction products, in particular for polyisocyanate polyaddition reaction products having a hardblock >40%.

According to embodiments, the compounds selected from polyols derived from dimer fatty acids and/or dimer fatty alcohols are selected from polyester polyols derived from dimer fatty acids. Preferred dimer fatty acids are dimers of C10 to a C30, more preferably C12- to C25, particularly C14 to C22 fatty acids. Suitable dimer fatty acids include the dimerisation products of oleic acid, linoleic acid, linolenic acid, palmitoleic acid and elaidic acid. The dimerisation products of the unsaturated fatty acid mixtures obtained in the hydrolysis of natural fats and oils, e.g., sunflower oil, soybean oil, olive oil, rapeseed oil, cottonseed oil and tall oil may also be used. In addition to the dimer fatty acids, dimerisation usually results in varying amounts of oligomeric fatty acids (so called "trimer") and residues of monomeric fatty acids (so-called "monomer"), or esters thereof, being present. Suitable dimer fatty acids have a dimer acid content greater than 60%, preferably greater than 75%, more preferably in the range 90 to 99.5%, particularly 95 to 99%, and especially 97 to 99%. Commercially available polyols which may be used in the practice of the invention include crystalline and amorphous materials such as Dynacoll® 7360, 7380, 7330, 7231, 7250 (Evonik), Rucoflex® S-105-10 (Bayer), Stepanpol® PN110 (Stepan), Priplast® 1838, 3196 (Croda). Typical molecular weight ranges from about 500 to about 7000.

According to the invention a method for improving the toughness of polyisocyanate polyaddition reaction products having a glass transition temperature of at least 80° C. is disclosed thereby using the additives selected from compounds made of polyols derived from dimer fatty acids and/or dimer fatty alcohols according to the first aspect of the invention.

According to embodiments, the method for improving the toughness of polyisocyanate polyaddition reaction products comprises reacting at an isocyanate index of at least 100 at least (a) isocyanates with (b) isocyanate-reactive compounds in the presence of if desired (c) catalyst compounds and if desired (d) blowing agents and/or other auxiliary compounds characterized in that the isocyanate-reactive compounds comprise 1-20 pbw of compounds selected from polyols derived from dimer fatty acids and/or dimer fatty alcohols (calculated on the total weight of ingredients (a)-(d)) and wherein the hardblock content of the polyisocyanate polyaddition reaction products is at least 40%.

According to embodiments, the isocyanate-reactive compounds comprise 1-20 pbw, preferably 2.5 up to 7 pbw of compounds selected from polyols derived from dimer fatty acids and/or dimer fatty alcohols (calculated on the total weight of ingredients (a)-(d)). A particular suitable amount of compounds selected from polyols derived from dimer fatty acids and/or dimer fatty alcohols is about 5 pbw calculated on the total weight of ingredients (a)-(d).

According to embodiments, the compounds selected from polyols derived from dimer fatty acids and/or dimer fatty alcohols are selected from polyester polyols derived from dimer fatty acids. Preferred dimer fatty acids are dimers of C10 to a C30, more preferably C12- to C25, particularly C14 to C22 fatty acids. Suitable dimer fatty acids include the dimerisation products of oleic acid, linoleic acid, linolenic acid, palmitoleic acid and elaidic acid. Commercially available polyesters which may be used include crystalline and amorphous materials such as Dynacoll® 7360, 7380, 7330, 7231, 7250 (Evonik), Rucoflex® S-105-10 (Bayer), Stepanpol® PN110 (Stepan), Priplast® 1838, 3196 (Croda). Typical molecular weight ranges from about 500 to about 7000.

According to embodiments, the isocyanate-reactive compounds may comprise polyamines and/or polyetherpolyols and/or polyesterpolyols having an average molecular weight of preferably 32-6000 and an average nominal functionality of preferably 1-8 and the polyisocyanate polyaddition reaction products have polyurethane and/or polyurea bondings.

Examples of suitable polyetherpolyols and/or polyesterpolyols are ethylene glycol, diethylene glycol, triethylene glycol, propylene glycol, dipropylene glycol, tripropylene glycol, trimethylol propane, sorbitol, sucrose, glycerol, ethanediol, propanediol, butanediol, pentanediol, hexanediol, aromatic and/or aliphatic polyols having more carbon atoms than these compounds and having a molecular weight of up to 8000, polyester polyols having an average molecular weight of 200-8000, polyether polyester polyols having an average molecular weight of 200-8000 and polyether polyols having an average molecular weight of 200-8000. Most preferred are polyester and polyether polyols having an average molecular weight of 32-6000 and an average nominal functionality of 1-8. Mixtures of monools and/or polyols may be used as well.

According to embodiments, the polyisocyanates may be chosen from aliphatic, cycloaliphatic, araliphatic and, preferably, aromatic polyisocyanates, such as toluene diisocyanate in the form of its 2,4 and 2,6-isomers and mixtures thereof, diphenylmethane diisocyanates and variants thereof, and mixtures of diphenylmethane diisocyanates (MDI) and oligomers thereof having an isocyanate functionality greater than 2 known in the art as "crude" or polymeric MDI (polymethylene polyphenylene polyisocyanates). Mixtures of toluene diisocyanate, diphenylmethane diisocyanates and/or polymethylene polyphenylene polyisocyanates may be used as well.

The combining and mixing of the polyisocyanates and the other ingredients preferably is to be conducted at ambient pressure and at a temperature between 5° C. and 45° C. and more preferably between 5° C. and 30° C. in order to avoid undesired premature reactions as much as possible.

According to embodiments, the other auxiliary compounds (d) may be selected from non-isocyanate-reactive solvents, surfactants, scavengers, like alkylorthoformate and in particular tri-isopropylorthoformate, antimicrobial agents, fire retardants, smoke suppressants, UV-stabilizers, colorants, plasticizers, internal mould release agents, rheology modifiers, wetting agents, dispersing agents and fillers.

According to embodiments, the polyisocyanate polyaddition reaction products may further comprise filler materials as auxiliary compounds (d). The filler materials may be selected from wood chips, wood dust, wood flakes, wooden plates; paper and cardboard, both shredded or layered; sand, vermiculite, clay, cement and other silicates; ground rubber, ground thermoplastics, ground thermoset materials; honeycombs of any material, like cardboard, aluminium, wood and plastics; metal particles and plates; cork in particulate form or in layers; natural fibers, like flax, hemp and sisal fibers; synthetic fibers, like polyamide, polyolefin, polyaramide, polyester and carbon fibers; mineral fibers, like glass fibers and rock wool fibers; mineral fillers like $BaSO_4$ and $CaCO_3$; nanoparticles, like clays, inorganic oxides and carbons; glass beads, ground glass, hollow glass beads; expanded or expandable beads; untreated or treated waste, like milled, chopped, crushed or ground waste and in particular fly ash; woven and non-woven textiles; and combinations of two or more of these materials. A particular use is the manufacturing of semi-structural and structural composites comprising basalt fibres, carbon fibres, flax fibres and/or glass fibres.

According to embodiments, a moulding process may be used for making the polyisocyanate polyaddition reaction products, in that case it may be conducted according to the cast moulding process, the compression moulding process, the resin transfer moulding process, especially the vacuum assisted one, the resin infusion process, the prepregging process and the hand lay-up process. The process further may be conducted according to an injection-, an extrusion- or a pultrusion process. Microwave or induction curing may also be applied. The process may be conducted batch-wise, semi-continuously or continuously.

According to embodiments, the polyisocyanate polyaddition reaction products are prepared by reacting a polyisocyanate with a polyol giving a plurality of urethane groups and/or by reacting a polyisocyanate with a polyamine giving a plurality of urea groups and/or by allowing the polyisocyanate to trimerize using a trimerization catalyst and giving a plurality of isocyanurate groups.

According to embodiments, the polyisocyanate polyaddition reaction products are blown products and the blowing agents may be selected from inert blowing agents and reactive blowing agents. Examples of inert blowing agents are alkanes, hydrofluorocarbons, hydrochlorofluorocarbons, expandable microbeads and inert gases like air, $N_2$, $CO_2$, CO, $O_2$ and He and examples of reactive blowing agents are azodicarbonamide and water. Water is the most preferred blowing agent. The actual amount of blowing agent needed depends on the ingredients used to make the polyisocyanate polyaddition products, on the production process, on the selected blowing agent and on the desired density. The determination of the amount of blowing agent once the ingredients for making the polyisocyanate polyaddition products, the process and the desired density have been selected, is daily routine for a person who is ordinary skilled in the art.

In order to ensure that the hardblock content of the polyisocyanate polyaddition reaction product is more than 40%, the amount of polyisocyanates and isocyanate-reactive ingredients used in making and having a molecular weight of 500 or less and a molecular weight of more than 500 are chosen in such a way that the hardblock content of the materials is more than 40% as defined hereinbefore.

Isocyanate-reactive materials having a molecular weight of more than 500, when used in making the polyisocyanate polyaddition reaction products may be selected from polyester polyols, polyether polyols, polyether polyester polyols, polyester polyamines, polyester polyether polyamines and polyether polyamines. Preferably these isocyanate-reactive materials have an average molecular weight of more than 500-10,000 and an average nominal functionality of 2-6. Such materials have been widely described in the art and are commercially available.

Isocyanate-reactive materials having a molecular weight of at most 500, when used in making polyisocyanate polyaddition reaction products, may be selected from the chain extenders and cross-linkers commonly used in making elastomers of this type like ethylene glycol, polyethylene glycol having an average molecular weight of at most 500, 2-methyl-1,3-propanediol, neopentylglycol, propanediol, butanediol, pentanediol, hexanediol, ethylene diamine, toluene diamine, propylene glycol, polypropylene glycol having an average molecular weight of at most 500, glycerol, trimethylolpropane, sucrose and sorbitol and mixtures thereof.

In addition to the above ingredients, other ingredients used in the art for making materials comprising a plurality of urethane, urea and/or isocyanurate groups may be used like other catalysts, e.g. for enhancing urethane formation, surfactants, fire retardants, colourants, pigments, anti-microbial agents, fillers, internal mould release agents, cell-stabilizing agents and cell-opening agents.

The reaction of the polyisocyanates and the polyols is exothermic and may be conducted under ambient conditions. If desired the reaction may be enhanced by using a catalyst which stimulates urethane formation and/or by applying an increased temperature, e.g. 30-80° C. No further special measures are to be taken since the reaction will go to completion by itself due to the exothermic character.

The reaction of the polyisocyanates with the polyamines and/or the water is strongly exothermic and does not require heating or catalysis, although the polyisocyanates may be supplied at slightly increased temperature (e.g. up to 50° C.) to ensure liquidity.

According to embodiments, the polyisocyanate polyaddition reaction products can be selected from polyisocyanurate (PIR) comprising products and the method comprises a process wherein the compounds (a)-(d) are reacted at an isocyanate index in the range 150 up to 15000 and the catalyst comprises at least one trimerization catalyst. Preferably the reaction is conducted at an index of preferably at least 300 and most preferably at least 500.

According to embodiments, the polyisocyanate polyaddition reaction products can be selected from polyisocyanurate (PIR) comprising products and the hardblock content is at least 60 wt %

According to embodiments, the polyisocyanate polyaddition reaction products can be selected from polyisocyanurate (PIR) comprising products and the trimerization catalyst may be selected from organic metal salts, preferably alkali or earth alkali organic metal salts, more preferably metal carboxylates or alkoxides and mixtures thereof, the carboxylate/alkoxide group preferably having 1-12 carbon atoms but not limited thereto. Also carboxylates having ring structures such as sodium or potassium benzoate are suitable trimerization catalysts. Most preferred examples are potassium acetate, potassium hexanoate, potassium ethylhexanoate, potassium octanoate, potassium lactate, sodium ethoxide, sodium formate, potassium formate, sodium acetate, potassium benzoate and mixtures thereof. Catalysts of this type are commercially available; examples are Catalyst LB (comprising potassium acetate) from Huntsman, Dabco K2097 and Dabco K15 (comprising potassium octanoate) from Air products.

According to embodiments, the polyisocyanate polyaddition reaction products can be selected from polyisocyanurate (PIR) comprising products and the trimerization catalyst may be selected from a composition containing a lithium halide (preferably LiCl) and an epoxy resin.

According to embodiments, the polyisocyanate polyaddition reaction products are polyisocyanurate (PIR) comprising products and the method for forming said polyisocyanurate comprising product further comprises after the step of reacting at an isocyanate index in the range 150 up to 15000 compounds (a)-(d) the step of curing the obtained composition at elevated temperature in order to form a cured polyisocyanurate comprising product. The curing is conducted at a temperature between 50° C. and 350° C. and most preferably in the range between 125° C. and 250° C. This reaction may take between 5 seconds and 10 hours and preferably takes between 15 seconds and 2 hours. The process may be conducted at ambient pressure or at reduced or elevated pressure. Preferably heat is applied in order to bring the (curable) composition to a temperature above 50° C. and most preferably above 80° C. Then the curable composition may cure fast (so-called snap-cure) while the temperature increases further (the reaction is exothermic). Before curing the polyisocyanurate comprising products the (curable) composition may be fed into a mould in order to give it a certain shape or into a cavity of an object in order to provide the object with a polyisocyanurate interior, or onto a surface to provide such a surface with a polyisocyanurate cover, or it may be used to repair an object.

According to embodiments, the polyisocyanate polyaddition reaction products are polyurethane (PUR) or polyurea comprising products made at an isocyanate index around 100, preferably at an isocyanate index in the range 90-110 and wherein the amount and/or type of isocyanate reactive compounds are chosen such that the hardblock content is >40 wt %, preferably >50 wt %.

According to embodiments, the polyisocyanate polyaddition reaction products are blown polyurethane (PUR) or polyurea comprising products made at an isocyanate index around 100, preferably at an isocyanate index in the range 90-110 and wherein the amount and/or type of isocyanate reactive compounds are chosen such that the hardblock content is >40 wt %, preferably >50 wt % and wherein water and/or other blowing agent are added in an amount of for example 5 pbw. The actual amount of blowing agent needed depends on the ingredients used to make the polyisocyanate polyaddition products, on the production process, on the selected blowing agent and on the desired density. The determination of the amount of blowing agent once the ingredients for making the polyisocyanate polyaddition products, the process and the desired density have been selected, is daily routine for a person who is ordinary skilled in the art.

According to embodiments, the polyisocyanate polyaddition reaction products are polyurethane (PUR) comprising products made at an isocyanate index around 100 and wherein a catalyst is used which enhances the formation of urethane groups. Preferably the (PUR) catalyst is used in an amount of 0.1-2% by weight (on all isocyanate reactive ingredients). Such catalysts are generally known in the art. Examples are amine catalysts, like triethylenediamine, N,N-dimethylethanolamine, bis (N,N-dimethylaminoethyl)ether, 2-(2-dimethylaminoethoxy)-ethanol, N,N,N'-trimethyl-N'-hydroxyethylbisaminoethyl-ether, N-(3-dimethylaminopropyl)-N,N-diisopropanolamine, N,N'-diethylpiperazine and 1-(bis(3-dimethyl-aminopropyl)amino-2-propanol and organometallic compounds like stannous octoate and dibutyltin dilaurate. Mixtures of catalysts may be used as well.

According to embodiments, polyisocyanate polyaddition reaction products having increased toughness are disclosed. In particular the polyisocyanate polyaddition reaction products have a hardblock content of more than 40%, a glass transition temperature >80° C. and a toughness value $G_{1c}$>200 J/m$^2$.

According to embodiments, the polyisocyanate polyaddition reaction products are polyisocyanurate comprising materials (PIR) having a hardblock content of more than 40%, a glass transition temperature >80° C. and a toughness value $G_{1c}$>200 J/m$^2$, preferably $G_{1c}$>300 J/m$^2$. Preferably the PIR material has a hardblock content >50%, more preferably >60%.

According to embodiments, the polyisocyanate polyaddition reaction products are polyisocyanurate comprising materials (PIR) having a hardblock content of more than 40%, preferably >50%, more preferably >60%, a toughness value $G_1$, >200 J/m$^2$, preferably $G_{1c}$>300 J/m$^2$ and a glass transition temperature >150° C.

According to embodiments, the polyisocyanate polyaddition reaction products are polyisocyanurate comprising materials (PIR) having a hardblock content of more than 40%, a glass transition temperature >80° C. and a toughness value $G_{1c}$>200 J/m$^2$. preferably $G_{1c}$>300 J/m$^2$, most preferably $G_{1c}$>400 J/m$^2$.

The polyisocyanurate comprising composite materials according to the present invention may be used in sporting goods, in high volume production of automotive parts, in train parts, aerospace, marine applications, wind power devices, window lineals, structural parts, adhesives, packaging, encapsulants, insulators and (spray) coatings.

The invention is illustrated with the following examples.

EXAMPLES

Chemicals Used:

Priplast® 1838 ex. Croda: 2000 MW polyester diol based on Croda's Pripol C36 dimer fatty acids.

Polyol 1: OH terminated polyol with MW of 650 and functionality of 2.1.

Polyol 2: OH terminated polyol with MW of 550 and functionality of 3.

Polyol 3: OH terminated 2 functional polyol with Mw of 400

Phthalic anhydride

Dabco® K2097 ex Air Products: 30 wt % potassium acetate in diethylene glycol catalyst EID9932: Base isocyanate with NCO-value of 33%

EID10012: prepolymer based on EID9932 containing 5.9 wt % Priplast® 1838. The prepolymer was made by standard methods known by persons skilled in the art.

Example 1

Preparation Polyol 3/Phthalic Anhydride/Dabco® K2097 Mixture

To 91.6 pbw polyol 3, 5.4 pbw Dabco® K2097 and 3 pbw phthalic anhydride was added. This mixture was heated under stirring for 1 hour at ambient pressure.

The mixture was allowed to cool down at ambient temperature and kept under nitrogen atmosphere.

Example 2

Reactive Polyisocyanate Composition According the Invention and Curing Process of this Composition The reactive polyisocyanate composition was prepared by mixing 85 pbw EID10012, 5 pbw of the polyol 3/phthalic anhydride/Dabco® K2097 mixture from example 1 and 10 pbw polyol 1 for 5 minutes in a vacuum mixer at 1500 rpm and 10 mbar.

After mixing the components a transparent liquid resin is obtained.

Subsequently the reactive polyisocyanate composition was cured in a vertical standing aluminium mould with a width of 4 mm and cured at 90° C. for 5 min. During curing of the resin the systems becomes opaque.

After 5 minutes curing the solid opaque casting was demoulded and further post cured for 20 min at 180° C.

Example 3

Comparative Example of a Reactive Polyisocyanate Composition and Curing Process of this Composition The reactive polyisocyanate composition was prepared by mixing 80 pbw EID9932, 5 pbw of the polyol 3/phthalic anhydride/Dabco® K2097 mixture from example 1 and 15 pbw polyol 1 for 5 minutes in a vacuum mixer at 1500 rpm and 10 mbar.

After mixing the components a transparent liquid resin is obtained.

Subsequently the reactive polyisocyanate composition was poured in a vertical standing aluminium mould with a width of 4 mm and cured at 90° C. for 5 min. During curing the resin stays transparent.

After 5 minutes curing the transparent solid casting was demoulded from the mould and further post cured for 20 min at 180° C.

Following measurements were performed on the cured materials castings:

Flexural bending test according ENISO 178

Fracture toughness ($G_{1C}$ and $K_{1C}$) according ISO 13586

Table 1 below shows the composition of the cured castings in pbw, the isocyanate index, the flexural bending test and fracture toughness test results of example 2 according the invention and the comparative example 3.

TABLE 1

|  | Example 2 | Example 3 |
|---|---|---|
| EID 9932 | — | 80 |
| EID 10012 | 85 | — |
| Polyol 1 | 10 | 15 |
| Mixture of example 1 | 5 | 5 |
| ISO index | 969 | 822 |
| Flexural Modulus (Mpa) | 2624 | 2811 |
| Flexular Strain @ break (%) | 6.3 | 4.02 |
| Flexural Stress @ break (Mpa) | 118 | 99 |
| $G_{1c}$ (J/m$^2$) | 325 | 157 |
| $K_{1c}$ (Mpa(m)$^{1/2}$) | 0.898 | 0.666 |
| Glass transition temperature (Tg), Maximum tan d peak (° C.) | 218 | 220 |

The $G_{1C}$ fracture toughness property of the opaque casting of example 2 containing 5 pbw Priplast® 1838 in the prepolymer EID 10012 is more than double the value of the $G_{1C}$ fracture toughness property of the transparent casting of example 3 were no Priplast® 1838 is present.

Also the flexural strain of example 2 is about 50% higher than the flexural strain of example 3.

Example 4

Polyol 3/Phthalic Anhydride/Dabco® K2097 Mixture According Example 1

Here 81.33 pbw polyol 3, 12 pbw Dabco® K2097 and 6.67 pbw phthalicanhydride were used instead to prepare the mixture.

Example 5

Reactive Polyisocyanate Composition According the Invention and Curing Process of this Composition The reactive polyisocyanate composition was prepared by mixing 41 pbw EID9932, 3 pbw of the polyol 3/phthalic anhydride/Dabco® K2097 mixture from example 4, 51 pbw polyol 2 and 5 pbw Priplast® 1838 for 5 minutes in a vacuum mixer at 1500 rpm and 10 mbar. After mixing the components a transparent liquid resin is obtained.

Subsequently the reactive polyisocyanate composition was cured in a vertical standing aluminium mould with a width of 4 mm and cured at 90° C. for 5 min During curing of the resin the systems becomes opaque.

After 5 minutes curing the solid opaque casting was demoulded and further post cured for 20 min at 180° C.

Example 6

Comparative Example of a Reactive Polyisocyanate Composition and Curing Process of this Composition The reactive polyisocyanate composition was prepared by mixing 42.6 pbw EID9932, 3 pbw of the polyol 3/phthalic anhydride/Dabco® K2097 mixture from example 4 and 54.4 pbw polyol 2 for 5 minutes in a vacuum mixer at 1500 rpm and 10 mbar.

After mixing the components a transparent liquid resin is obtained.

Subsequently the reactive polyisocyanate composition was poured in a vertical standing aluminium mould with a width of 4 mm and cured at 90° C. for 5 min. During curing the resin stays transparent.

After 5 minutes curing the transparent solid casting was demoulded from the mould and further post cured for 20 min at 180° C.

The table 2 below shows the composition in pbw and isocyanate index of the opaque casting of example 5 and the transparent casting of the comparative example 6.

TABLE 2

|  | Example 5 | Example 6 |
|---|---|---|
| EID 9932 (pbw) | 41 | 42.6 |
| Polyol 2 (pbw) | 51 | 54.4 |
| Priplast 1838 (pbw) | 5 | — |
| Mixture of example 4 (pbw) | 3 | 3 |
| ISO index | 102.8 | 102.1 |

The invention claimed is:

1. A method for improving the toughness of polyisocyanate polyaddition reaction products having a glass transition temperature of at least 80° C. said method comprising at least reacting at an isocyanate index ranging from 150 to 969:
   (a) isocyanates, and
   (b) isocyanate-reactive compounds, and
   (c) catalyst compounds comprising at least one trimerization catalyst, and optional
   (d) blowing agents and/or other auxiliary compounds
characterized in that the isocyanate-reactive compounds (b) comprise 1-20 parts by weight, based on the total weight of ingredients (a)-(d), of compounds selected from polyols derived from dimer fatty acids and/or dimer fatty alcohols wherein the hardblock content of the polyisocyanate polyaddition reaction products is at least 40% by weight and the polyisocyanate polyaddition products have a toughness value $G_{1c}$>300 J/m².

2. The method according to claim 1, wherein the polyols derived from dimer fatty acids and/or dimer fatty alcohols are selected from polyester polyols derived from dimer fatty acids.

3. The method according to claim 1, wherein the dimer fatty acids includes dimerisation products of fatty acids selected from C10-C30 fatty acids.

4. The method according to claim 1, wherein the dimer fatty acids includes dimerisation products of oleic acid, linoleic acid, linolenic acid, palmitoleic acid and/or elaidic acid.

5. The method according to claim 1, wherein the isocyanate-reactive compounds (b) comprise 2.5 up to 7 parts by weight, based on the total weight of ingredients (a)-(d), of compounds selected from polyols derived from dimer fatty acids and/or dimer fatty alcohols.

6. The method according to claim 1, wherein the isocyanate-reactive compounds (b) comprise polyamines and/or polyetherpolyols and/or polyesterpolyols having an average molecular weight of 32-6000 and an average nominal functionality of 1-8 and the polyisocyanate polyaddition reaction products have polyurethane and/or polyurea bondings.

7. The method according to claim 1, wherein the isocyanates (a) comprise an aromatic polyisocyanate.

8. The method according to claim 1, wherein the auxiliary compounds (d) are selected from non-isocyanate-reactive solvents, surfactants, scavengers, antimicrobial agents, fire retardants, smoke suppressants, UV-stabilizers, colorants, plasticizers, internal mould release agents, rheology modifiers, wetting agents, dispersing agents, and fillers.

9. The method according to claim 1, wherein the method comprises a moulding process selected from a cast moulding process, a compression moulding process, a resin transfer moulding process (with or without use of vacuum), a resin infusion process, a prepregging process, or a hand lay-up process conducted according to an injection-, an extrusion- or a pultrusion process.

10. The method according to claim 1, wherein the trimerization catalyst is selected from an organic metal salt.

11. The method according to claim 1, wherein the trimerization catalyst is selected from a composition containing a lithium halide and an epoxy resin.

12. The method according to claim 1, wherein the polyisocyanate polyaddition products are polyisocyanurate (PIR) comprising products and further comprises after the step of reacting ingredients (a)-(d), the step of applying a curing step at elevated temperature in order to form a cured polyisocyanurate comprising product, wherein the curing step is conducted at a temperature between 50° C. and 350° C.

13. Polyisocyanurate (PIR) comprising products made according to claim 1, said products having a hardblock content of more than 50%, and a glass transition temperature >150° C.

* * * * *